US011931904B2

(12) United States Patent
Kobayashi et al.

(10) Patent No.: US 11,931,904 B2
(45) Date of Patent: Mar. 19, 2024

(54) ABNORMALITY DETERMINATION APPARATUS, ABNORMALITY DETERMINATION SYSTEM, AND ABNORMALITY DETERMINATION METHOD

(71) Applicant: Nissan Motor Co., Ltd., Kanagawa (JP)

(72) Inventors: Seiichi Kobayashi, Kanagawa (JP); Toru Takagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 710 days.

(21) Appl. No.: 17/051,950

(22) PCT Filed: May 1, 2018

(86) PCT No.: PCT/JP2018/017419
§ 371 (c)(1),
(2) Date: Oct. 30, 2020

(87) PCT Pub. No.: WO2019/211892
PCT Pub. Date: Nov. 7, 2019

(65) Prior Publication Data
US 2021/0229283 A1 Jul. 29, 2021

(51) Int. Cl.
*B25J 9/16* (2006.01)
*B25J 11/00* (2006.01)
*B25J 15/04* (2006.01)

(52) U.S. Cl.
CPC .............. *B25J 9/1674* (2013.01); *B25J 9/163* (2013.01); *B25J 9/1653* (2013.01); *B25J 11/005* (2013.01); *B25J 15/0483* (2013.01)

(58) Field of Classification Search
CPC ........ B25J 9/1674; B25J 9/163; B25J 9/1653; B25J 11/005; B25J 15/0483;
(Continued)

(56) References Cited

U.S. PATENT DOCUMENTS 6,260,427 B1 7/2001 Jones et al.
7,421,886 B1 * 9/2008 Fox ...................... B25J 19/0095
73/40.7
(Continued)

FOREIGN PATENT DOCUMENTS

EP 1906282 A2 * 4/2008 ........... G05B 19/406
EP 1906282 A2 4/2008
(Continued)

OTHER PUBLICATIONS

Y. Xuming "Modern equipment management and inspection" Northeastern University Press, pp. 120-123; Oct. 2014 (7 pages).
(Continued)

*Primary Examiner* — Mary Cheung
(74) *Attorney, Agent, or Firm* — Osha Bergman Watanabe & Burton LLP

(57) ABSTRACT

An abnormality determination apparatus of the present invention acquires state data from work equipment provided with an attaching part to which a plural kinds of work parts are attached in a replaceable manner, identifies the kind of a work part attached to the attaching part, sets, corresponding to the identified kind of the work part, abnormality determination data for determining an abnormality of the work equipment, acquires, from among state data acquired from the work equipment, state data of a time when the identified kind of the work part was being attached, and compares the acquired state data with the set abnormality determination data to determine an abnormality of the work equipment.

13 Claims, 6 Drawing Sheets

(58) Field of Classification Search
CPC .......... G05B 2219/31402; G05B 2219/31432; G05B 2219/35291; G05B 19/41875; G05B 19/4065; Y02P 90/02
See application file for complete search history.

(56) References Cited

U.S. PATENT DOCUMENTS

| | | | |
|---|---|---|---|
| 2008/0082200 A1 | 4/2008 | Ikeda | |
| 2009/0175694 A1 | 7/2009 | Craig et al. | |
| 2016/0121484 A1 | 5/2016 | Ikeda et al. | |
| 2017/0038761 A1 | 2/2017 | Ando et al. | |
| 2017/0357243 A1* | 12/2017 | Takayama | G06N 3/08 |

FOREIGN PATENT DOCUMENTS

| | | | | |
|---|---|---|---|---|
| JP | S63-288688 A | | 11/1988 | |
| JP | H11-333657 A | | 12/1999 | |
| JP | 2001-147707 A | | 5/2001 | |
| JP | 2004-017260 A | | 1/2004 | |
| JP | 2007-219991 A | | 8/2007 | |
| JP | 2011-518045 A | | 6/2011 | |
| JP | 2011189459 A | * | 9/2011 | |
| JP | 2012-250334 A | | 12/2012 | |
| JP | 2013-043232 A | | 3/2013 | |
| JP | 2014018822 A | * | 2/2014 | |
| JP | 2014-054692 A | | 3/2014 | |
| JP | 2014061556 A | * | 4/2014 | |
| JP | 2016133944 A | * | 7/2016 | ............. G05B 23/02 |
| JP | 2017/033346 A | | 2/2017 | |
| JP | 2017-220111 A | | 12/2017 | |
| WO | WO-2016113814 A1 | * | 7/2016 | ............. G07C 5/008 |

OTHER PUBLICATIONS

R. Xiaozhong "Advanced Manufacturing Technology 3rd Edition" Huazhong University of Science and Technology Press, pp. 244-245; Mar. 2017 (6 pages).

* cited by examiner

ABNORMALITY DETERMINATION APPARATUS, ABNORMALITY DETERMINATION SYSTEM, AND ABNORMALITY DETERMINATION METHOD

TECHNICAL FIELD

The present invention relates to an abnormality determination apparatus, an abnormality determination system, and an abnormality determination method, for acquiring, from work equipment provided with an attaching part to which a plural kinds of work parts are attached in a replaceable manner, state data indicating a state of the work equipment and determining an abnormality of the work equipment.

BACKGROUND ART

As an abnormality determination method for work equipment such as an industrial robot and a machine tool, there is a related art disclosed in Patent Literature 1. An abnormal load detection apparatus disclosed in the Patent Literature 1 estimates a disturbance torque of a servomotor for driving a robot arm or the like, compares the estimated disturbance torque with a predetermined reference torque, and determines an abnormality.

CITATION LIST

Patent Literature

Patent Literature 1: Japanese Unexamined Patent Application Publication No. 2007-219991

SUMMARY OF INVENTION

Problems to be Solved by Invention

However, even in the same robot, when a work part attached to a front end of a robot arm is replaced, the weight and work motion of the work part greatly change. For example, when attached to the front end of the robot arm is a spot welder and when it is a work hand, the weight and work motion greatly change between them.

Accordingly, the above-mentioned conventional abnormal load detection apparatus has a problem that, when a work part attached to the front end of the robot arm is replaced, the weight and work motion of the work part greatly change to make it impossible to correctly determine an abnormality of the work equipment such as a robot.

Then, the present invention is proposed in consideration of the above-mentioned circumstances and an object thereof is to provide an abnormality determination apparatus, an abnormality determination system, and a method thereof, capable of correctly determining an abnormality of work equipment even if a work part attached to a front end of a robot arm is replaced.

Means to Solve Problems

In order to solve the above-mentioned problems, an abnormality determination apparatus, an abnormality determination system, and a method thereof according to an aspect of the present invention acquire, from work equipment, a state data indicating a state of the work equipment and identifies the kind of a work part attached to an attaching part. Also, corresponding to the identified kind of the work part, abnormality determination data for determining an abnormality of the work equipment is set, and from among state data acquired from the work equipment, state data of the time when the identified kind of the work part was being attached is acquired. Then, the acquired state data is compared with the set abnormality determination data, to determine an abnormality of the work equipment.

Effects of Invention

According to the present invention, it is possible to correctly determine an abnormality of work equipment even if a work part attached to a front end of a robot arm is replaced.

MODE OF IMPLEMENTING INVENTION

First Embodiment

Hereunder, the first embodiment according to the present invention will be explained with reference to the drawings. In the description of the drawings, the same parts are represented with the same reference marks to omit explanation.

(Configuration of Abnormality Determination System)

Figure 1:
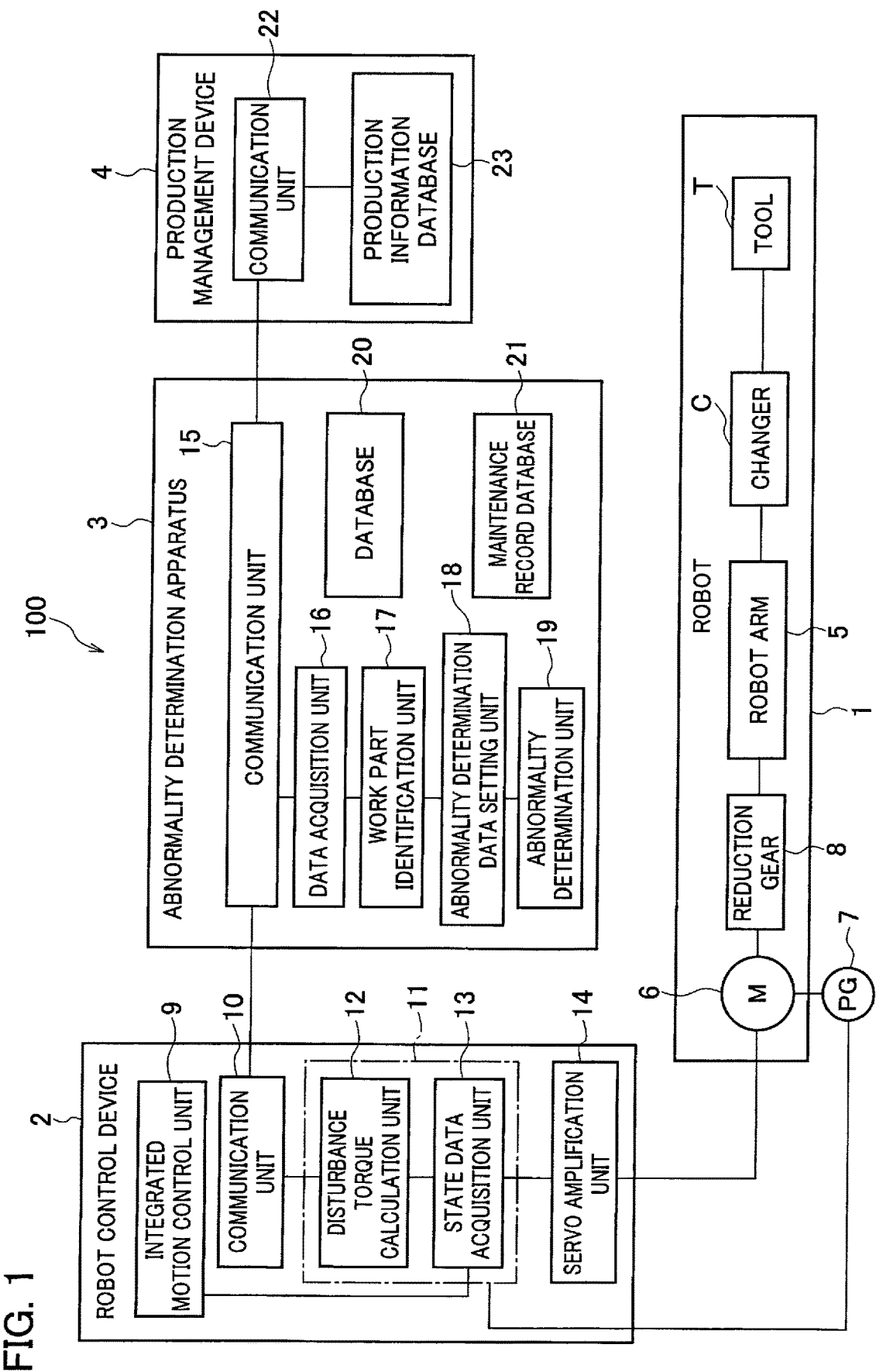
FIG. 1 is a block diagram illustrating an overall configuration of an abnormality determination system according to a first embodiment of the present invention.

FIG. 1 is a block diagram illustrating a configuration of an abnormality determination system provided with an abnormality determination apparatus according to the embodiment. As illustrated in FIG. 1, the abnormality determination system 100 according to the embodiment is configured with a robot 1, a robot control device 2, the abnormality determination apparatus 3, and a production management device 4. The robot 1 is described as an example of work equipment provided with an attaching part to which a plural kinds of work parts are attached in a replaceable manner. For example, the robot 1 is a teaching-playback-type multiaxis machine and is of a multijoint type. However, the robot 1 may not be a multiaxis machine but may be a single axis machine.

Although the robot 1 has a plurality of motor driving systems as joint axes or motion axes, FIG. 1 illustrates a motor driving system for one axis. A robot arm 5 is driven through a reduction gear 8 by a servomotor (hereunder simply mentioned as a motor) 6. The motor 6 is provided with a pulse coder (a pulse generator or an encoder) 7 that is a detector for a rotation angle position and velocity. At a front end of the robot arm 5, there is arranged a changer C for attaching a tool T. The changer C functions as an attaching part to which a plural kinds of tools T are attached in a replaceable manner. The tool T is a work part that is attached to the front end of the robot arm 5 and performs an actual work. The tool T includes a welding work part such as a spot welder or a laser welder and a work object holding work part such as a work hand. Other then them, it may include a seal applying machine or the like.

The robot control device 2 is provided with an integrated motion control unit 9, a communication unit 10, a servo control unit 11, and a servo amplification unit 14. The servo control unit 11 includes a disturbance torque calculation unit 12 and a state data acquisition unit 13, and on receiving a command from the higher integrated motion control unit 9, drives the motor 6 through the servo amplification unit 14. The pulse coder 7 attached to the motor 6 forms, between the servo control unit 11, a feedback loop for controlling and processing the rotation angle position and velocity of the motor 6.

The servo control unit 11 is provided with, other than the disturbance torque calculation unit 12 and state data acquisition unit 13, a processor for carrying out a process for controlling the rotation angle position, velocity, and current of the motor 6, a ROM for storing a control program, and a nonvolatile memory unit for storing set values and various kinds of parameters. Also, the servo control unit 11 is provided with a RAM for temporarily storing data during an operation process, a register for counting position feedback pulses from the pulse coder 7 and detecting an absolute rotation angle position of the motor 6, and the like.

The robot 1 is of multijoint, and therefore, requires motor driving systems such as the one illustrated in FIG. 1 to the number of joint axes. However, illustrated in FIG. 1 is only for one axis and the other motor driving systems are omitted from the illustration. Further, there will be a case of interposing a speed changing gear train between the motor 6 and the reduction gear 8 of FIG. 1.

The integrated motion control unit 9 is positioned higher than the servo control unit 11 and achieves a direct operation control of the robot 1. The communication unit 10 achieves, between a communication unit 15 to be explained later of the abnormality determination apparatus 3, transmission and reception of necessary data via, for example, a LAN or the like. Also, the state data acquisition unit 13 has a function of periodically collecting various kinds of data indicating operating states of the individual joint axes of the robot 1. The collected data include data indicating a collection period. The disturbance torque calculation unit 12 has a function of calculating a disturbance torque value according to data acquired by the state data acquisition unit 13. Since the servo control unit 11 is configured to include the disturbance torque calculation unit 12 and state data acquisition unit 13, a disturbance torque value obtained by calculation by the disturbance torque calculation unit 12 is outputted through the communication unit 10 to the abnormality determination apparatus 3. With this configuration, the servo control unit 11 takes a so-called software servo aspect.

The abnormality determination apparatus 3 is provided with the communication unit 15, a data acquisition unit 16, a work part identification unit 17, an abnormality determination data setting unit 18, an abnormality determination unit 19, a database 20, and a maintenance record database 21. Here, the abnormality determination apparatus 3 has a controller made with a general-purpose electronic circuit such as a microcomputer, a microprocessor, a CPU, or the like and a peripheral device such as a memory. Accordingly, by executing a specific program, this controller operates as the communication unit 15, data acquisition unit 16, work part identification unit 17, abnormality determination data setting unit 18, abnormality determination unit 19, database 20, and maintenance record database 21.

The communication unit 15 has a function of conducting transmission and reception of necessary data via, for example, a LAN or the like between the respective communication units 10 and 22 of the above-mentioned robot control device 2 and production management device 4.

The data acquisition unit 16 acquires state data from the robot 1 through the communication unit 15. In particular, the data acquisition unit 16 acquires, as the state data, various kinds of data collected by the state data acquisition unit 13 of the robot control device 2 and indicating operating states of the robot 1, as well as the disturbance torque value calculated by the disturbance torque calculation unit 12. Then, the data acquisition unit records the acquired state data in the database 20 according to the kind of the tool T identified by the work part identification unit 17.

The work part identification unit 17 identifies the kind of the tool T attached to the changer C. More precisely, the work part identification unit 17 acquires, from the maintenance record database 21, a maintenance record recorded at the time when the tool T was attached, and according to the acquired maintenance record, identifies the kind of the tool T attached to the changer C. For example, if a date and time when the tool T was changed from T1 to T2 is recorded in the maintenance record, it is identified that the kind of the tool T is T1 before the date and time and that the kind of the tool T is T2 after the date and time.

The abnormality determination data setting unit 18 sets, based on the kind of the tool T identified by the work part identification unit 17, abnormality determination data for determining an abnormality of the robot 1. In particular, the abnormality determination data setting unit 18 calculates a threshold value from state data of the tool T of the identified kind identified by the work part identification unit 17 and sets the calculated threshold value as abnormality determination data. For example, if the kind of the tool T is T1, the abnormality determination data setting unit 18 acquires state data of the tool T1 from the database 20, uses the state data to calculate the average, variance, median of the same month previous year of the tool T1, and sets any one of them as a threshold value.

Also, the abnormality determination data setting unit 18 may set the abnormality determination data by processing, with a predetermined learning model, the state data of the tool T whose kind was identified by the work part identification unit 17. For example, if the kind of the tool T is T1, the abnormality determination data setting unit 18 acquires state data of the tool T1 from the database 20, processes the same with a predetermined learning model to find a waveform pattern or probability distribution of disturbance torque values or the like, and sets the found one as the abnormality determination data. Also, other than this, it is possible to find a parameter such as a frequency or standard deviation indicating a disturbance torque value variation and set the found one as the abnormality determination data.

The abnormality determination unit 19 acquires, from among the state data acquired by the data acquisition unit 16, state data of the time when the tool T whose kind was identified by the work part identification unit 17 was being attached. Then, the acquired state data is compared with the abnormality determination data set by the abnormality determination data setting unit 18 and an abnormality of the robot 1 is determined.

For example, if a threshold value serving as the abnormality determination data is set and if the kind of the tool T is T1, the abnormality determination unit 19 acquires, from the database 20, state data of the time when the tool T1 was being attached and uses the state data to calculate the latest average, variance, and median of the tool T1. Then, the average, variance, or median of the same month previous year set as the threshold value by the abnormality determination data setting unit 18 is compared with the calculated latest average, variance, or median and an abnormality of the robot 1 is determined.

Also, if a waveform pattern is set as the abnormality determination data, the abnormality determination unit 19 acquires, from the database 20, the state data of the time when the tool T1 was being attached and uses the state data to find a latest waveform pattern of the tool T1. Then, the waveform pattern of the same month previous year set by the abnormality determination data setting unit 18 is compared with the found latest waveform pattern and an abnormality of the robot 1 is determined.

The database 20 functions as a memory unit to store state data acquired by the data acquisition unit 16. The database 20 successively stores the state data according to the kind of the tool T and accumulates past state data.

As a technique of storing state data by the kinds of tools T, memory areas may be beforehand set according to the respective kinds of tools T and the state data of a tool T may be stored in a corresponding one of the memory areas. Alternatively, identification information such as a label showing the kind of a tool T may be added to state data thereof to be stored.

The maintenance record database 21 has a function of storing a maintenance record and an inspection result when maintenance and inspection are carried out on the robot 1. Accordingly, the maintenance record database 21 accumulates past maintenance record data and inspection result data. In particular, a maintenance record is recorded when a tool T is attached or replaced and includes the kinds of tools T before and after replacement and a replacement date and time.

The production management device 4 is a device for conducting management of production information including, for example, working conditions of production lines in a factory and is provided with a communication unit 22 and a production information database 23. The communication unit 22 carries out transmission and reception of necessary data via, for example, a LAN or the like between the communication unit 15 of the abnormality determination apparatus 3. The production information database 23 has a function of storing various kinds of collected production information. Accordingly, the production information database 23 accumulates various kinds of past production information. The production information includes the emergency stop information, maintenance record information, and the like of the robot 1 and of related facilities.

(Detection Method of Disturbance Torque)

The embodiment detects, as an example of the state data, a disturbance torque (disturbance load torque) applied to the motor 6 for driving each joint axis of the robot 1, and according to the disturbance torque, determines an abnormality of a corresponding motor driving system as an abnormality of the robot 1. A sequence of finding the disturbance torque is roughly as mentioned below.

Figure 2:
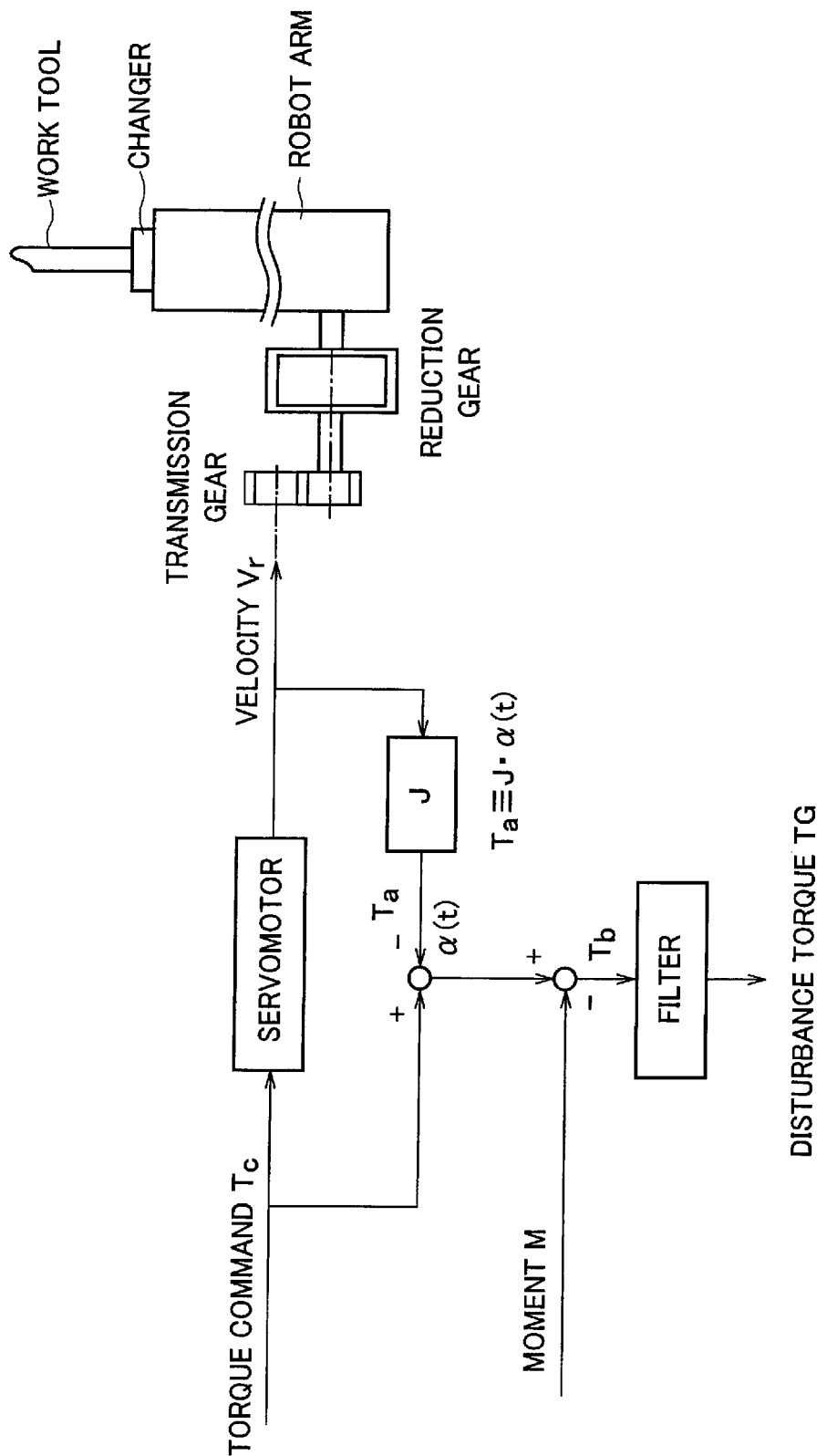
FIG. 2 is a block diagram for explaining a sequence of finding a disturbance torque.

As illustrated in the block diagram of FIG. 2, an actual velocity Vr of the motor 6 obtained from a velocity feedback signal from the pulse coder 7 is differentiated to find an acceleration $\alpha$, and the acceleration $\alpha$ is multiplied by a total inertia J applied to the motor 6 to find an acceleration torque Ta ($=J \times \alpha$). Next, the found acceleration torque Ta is subtracted from a torque command Tc to the motor 6, and further, a moment M is subtracted therefrom to find a disturbance torque Tb. The torque command Tc is obtained from a velocity loop process of the servo control unit 11. Thereafter, a predetermined filtering process is carried out to remove disturbance irregular components to obtain a disturbance torque TG. Such a process is carried out by the servo control unit 11 every predetermined sampling period, to find the disturbance torque TG.

More precisely, the servo control unit 11 is provided with a register that counts positional feedback pulses from the pulse coder 7 every predetermined sampling period and finds an absolute position of the motor 6. With this, the servo control unit 11 detects the absolute position of the motor 6 from the register, and from the absolute position of the motor 6, finds a rotation angle position (moved position) of the joint axis driven by the motor 6. Further, the servo control unit 11 carries out the process of FIG. 2 as explained before, to find the disturbance torque TG.

(State Data Recording Process)

Figure 3:
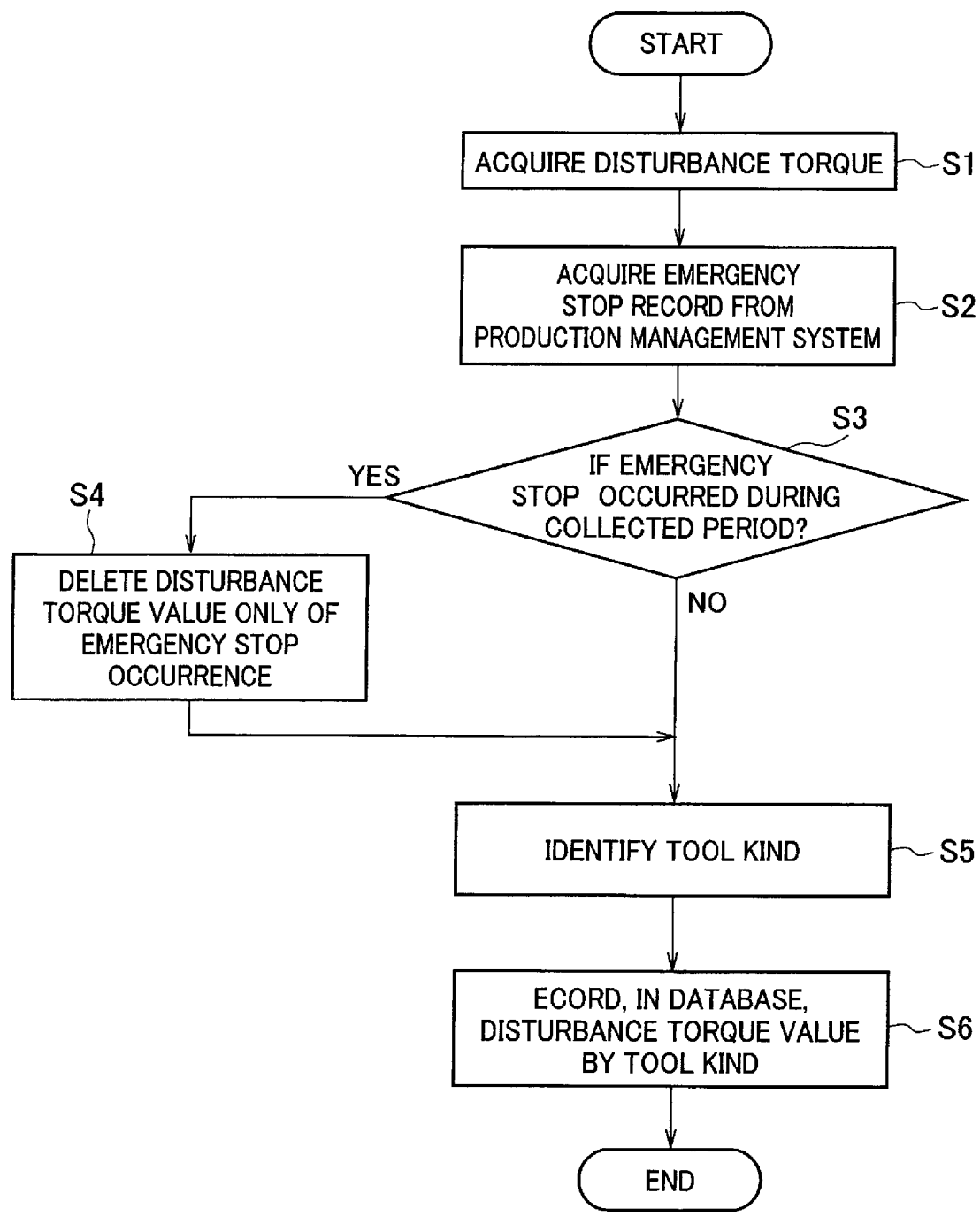
FIG. 3 is a flowchart illustrating a sequence of a state data recording process by an abnormality determination apparatus according to the first embodiment of the present invention.

With reference to FIG. 3, a state data recording process by the abnormality determination apparatus 3 according to the embodiment will be explained. FIG. 3 is a flowchart illustrating a processing sequence of the state data recording process by the abnormality determination apparatus 3. In FIG. 3, the disturbance torque value is explained as an example of the state data.

As illustrated in FIG. 3, in step S1, the data acquisition unit 16 acquires disturbance torque values calculated by the robot control device 2. The disturbance torque values are values at respective moved positions of the respective motion axes. Also, at the same time, information indicating a period during which the disturbance torque values were collected is obtained.

In step S2, the data acquisition unit 16 acquires facility emergency stop information from the production information database 23 of the production management device 4. In step S3, the data acquisition unit 16 determines whether or not a facility emergency stop occurred during the collection period of the acquired disturbance torque values, and if determines that an emergency stop occurred, advances to step S4. On the other hand, if determines that no emergency stop occurred, it advances to step S5.

In step S4, the data acquisition unit 16 deletes, from the acquired disturbance torque values, only a disturbance torque value of the time when the emergency stop occurred and advances to step S5.

In step S5, the work part identification unit 17 refers to maintenance record data recorded in the maintenance record database 21 and identifies the kind of the tool T attached to the changer C of the robot 1. In the maintenance record, there are recorded a date and time when the tool T was replaced and the kinds of tools T before and after the replacement. Also, the data acquisition unit 16 has acquired, at the time of acquisition of the disturbance torque values, the information indicating the period during which the disturbance torque values have been collected. Accordingly, based on the information, the work part identification unit 17 identifies the kind of the tool T attached to the changer C at the time when the disturbance torque values were collected.

In step S6, the data acquisition unit 16 records, in the database 20 according to the kind of the tool T identified in step S5, disturbance torque values among the acquired disturbance torque values from which the abnormal value due to the facility emergency stop was deleted. Accordingly, the database 20 records and accumulates only disturbance torque values excluding abnormal values caused by facility emergency stops associated with the kinds of tools T.

As a technique of recording state data according to the kinds of tools T, memory areas of the database 20 may be beforehand set for the kinds of tools T, respectively, and the data acquisition unit 16 may record disturbance torque values in a corresponding one of the set memory areas associated with the kind of the tool T. Alternatively, the data acquisition unit 16 may add, to a disturbance torque value, identification information such as a label corresponding to the kind of the tool T identified in step S5, and then, may record the same in the database 20. In this way, the acquired disturbance torque values are recorded in the database 20, and then, the state data recording process according to the embodiment ends.

(Abnormality Determination Process)

Figure 4:
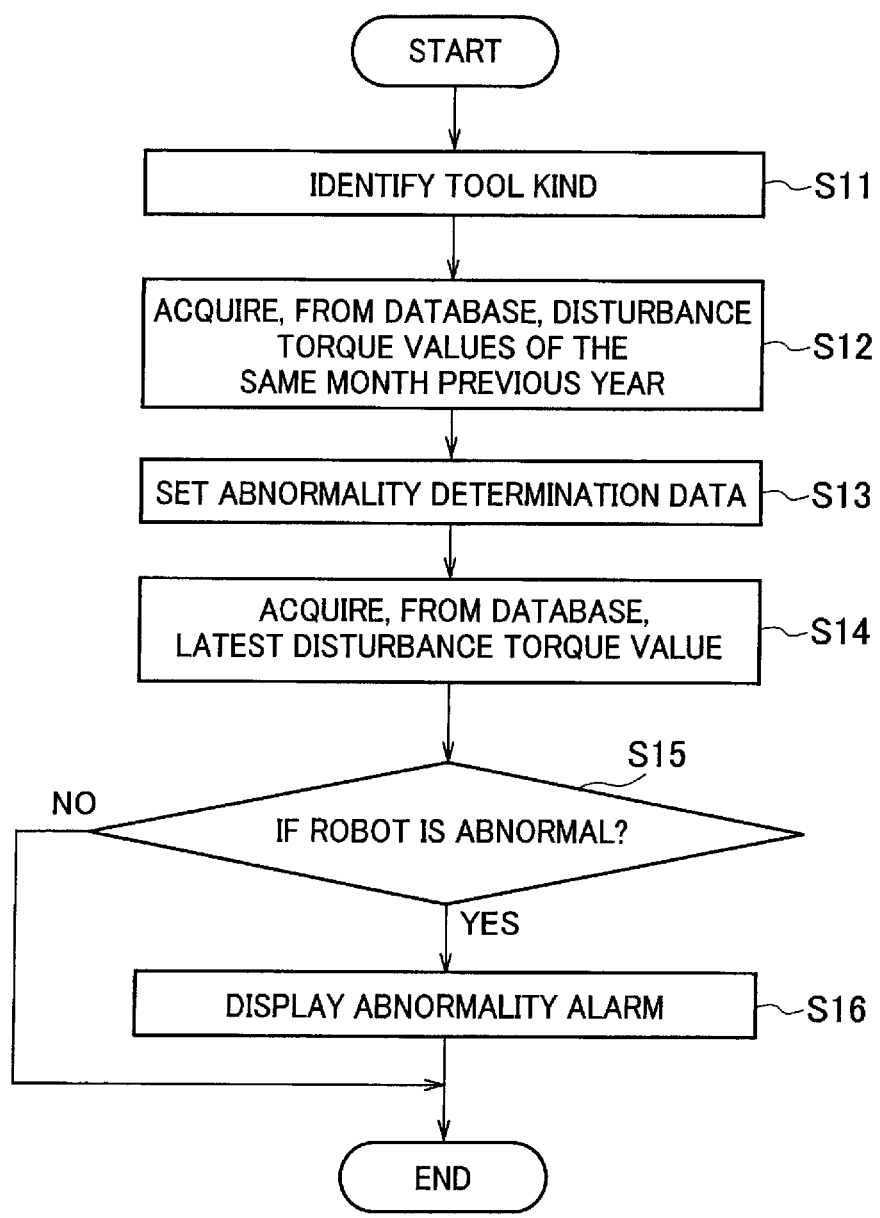
FIG. 4 is a flowchart illustrating a sequence of an abnormality determination process by the abnormality determination apparatus according to the first embodiment of the present invention.

With reference to FIG. 4, an abnormality determination process by the abnormality determination apparatus 3 according to the embodiment will be explained. FIG. 4 is a flowchart illustrating a processing sequence of the abnormality determination process by the abnormality determination apparatus 3. In FIG. 4, the disturbance torque value is explained as an example of the state data.

As illustrated in FIG. 4, in step S11, the work part identification unit 17 refers to maintenance record data recorded in the maintenance record database 21 and identifies the kind of the tool T attached to the changer C of the robot 1. The maintenance record records a date and time when the tool T was replaced and the kinds of tools T before and after the replacement, and therefore, the work part identification unit 17 is able to identify the kind of the tool T attached to the changer C of the robot 1 by referring to the maintenance record.

In step S12, the abnormality determination data setting unit 18 acquires from the database 20 disturbance torque value data of the same month previous year of the day on which the diagnosis is carried out from among disturbance torque value data of the tool T whose kind was identified in step S11.

There are stored state data by the kinds of tools T in the database 20, and therefore, the abnormality determination data setting unit 18 accesses a memory area in which disturbance torque values of the tool T of the identified kind identified in step S11 are stored and acquires the disturbance torque value data. Also, if identification information such as a label is added to state data of each kind of the tool T, the abnormality determination data setting unit 18 acquires, according to the identification information, the disturbance torque value data of the tool T whose kind was identified in step S11. However, if it is unable to acquire the disturbance torque value data of the same month previous year, nearest disturbance torque value data is deemed as the disturbance torque value data of the same month previous year and is acquired.

In step S13, the abnormality determination data setting unit 18 sets, corresponding to the kind of the tool T identified in step S11, abnormality determination data for determining an abnormality of the robot 1.

For example, if the identified kind of the tool T is T1, the abnormality determination data setting unit 18 acquires from the database 20, from among state data of the time when the tool T1 was being attached, disturbance torque value data of the same month previous year of the day on which the diagnosis is carried out and calculates an average, a variance, and a median of the acquired data. Thereafter, one or a plurality of them is set as abnormality determination data to be used as a threshold value for determining an abnormality. In this way, the abnormality determination data setting unit 18 sets the abnormality determination data by using the state data of the time when the tool T1 was being attached, and therefore, the abnormality determination data is set associated with the kind of the tool T.

Also, the abnormality determination data setting unit may process, with a predetermined learning model, the disturbance torque value data of the same month previous year of the day on which the diagnosis is carried out and may thereby set the abnormality determination data. For example, with respect to the disturbance torque value data, a predetermined process may be carried out to find a waveform pattern or probability distribution of the disturbance torque values and the found one may be set as the abnormality determination data. Also, other than this, a parameter such as a frequency, a standard deviation, or the like indicating a disturbance torque value variation may be obtained and used as the abnormality determination data.

In step S14, the abnormality determination unit 19 acquires from the database 20, from among disturbance torque value data of the time when the tool T of the identified kind identified in step S11 was being attached, latest disturbance torque value data. Thereafter, in step S15, the abnormality determination unit 19 comperes the acquired latest disturbance torque value data with the abnormality determination data set in step S13 and determines whether or not the robot 1 is abnormal.

For example, if the identified kind of the tool T is T1, the abnormality determination unit 19 acquires latest disturbance torque value data from among state data of the time when the tool T1 was being attached stored in the database 20. Then, it calculates at least one (or a plurality is allowed) of the average, variance, and median of the acquired data. Thereafter, it determines whether or not the calculated average, variance, or median of the latest disturbance torque value data is equal to or smaller than the threshold value (e.g. the average, variance, or median of the same month previous year) set in step S13. As a result, if the average, variance, or median of the latest disturbance torque values is equal to or smaller than the threshold value, it is determined that no abnormality is occurring on the robot 1 and the abnormality determination process according to the embodiment ends. On the other hand, if the average, variance, or median of the latest disturbance torque values is greater than the threshold value (e.g. the average, variance, or median of the same month previous year), it is determined that there is a probability of an abnormality occurring on the robot 1 and it advances to step S16.

If a waveform pattern obtained from a learning model is set as the abnormality determination data, the abnormality determination unit 19 acquires from the database 20, from among the state data of the time when the tool T1 was being attached, the latest disturbance torque value data. Then, it carries out a predetermined process on the acquired data, finds a waveform pattern of the latest disturbance torque values, and carries out a matching of the found waveform pattern of the latest disturbance torque values with the waveform pattern set in step S13. As a result, if a matching level is equal to or greater than a predetermined value so that the waveform patterns agree with each other, it is determined that no abnormality is occurring on the robot 1 and the abnormality determination process according to the embodiment ends. On the other hand, if the matching level is smaller than the predetermined value so that the waveform patterns do not agree with each other, it is determined that there is a probability of an abnormality occurring on the robot 1 and it advances to step S16.

In step S16, the abnormality determination unit 19 displays an abnormality alarm for the joint axis concerned on a display screen of a monitor (not illustrated) arranged for the abnormality determination apparatus 3 and the abnormality determination process according to the embodiment ends.

Effect of First Embodiment

As explained above in detail, the abnormality determination apparatus 3 according to the embodiment acquires state data from the robot 1 and identifies the kind of a tool T attached to the attaching part. Thereafter, corresponding to the tool T of the identified kind, it sets abnormality determination data for determining an abnormality of the robot 1, compares the set abnormality determination data with state data of the tool T of the identified kind, and determines an abnormality of the robot 1. With this, it is possible to correctly determine an abnormality of the robot 1 even if the tool T attached to a front end of the robot arm is replaced.

Figure 5:
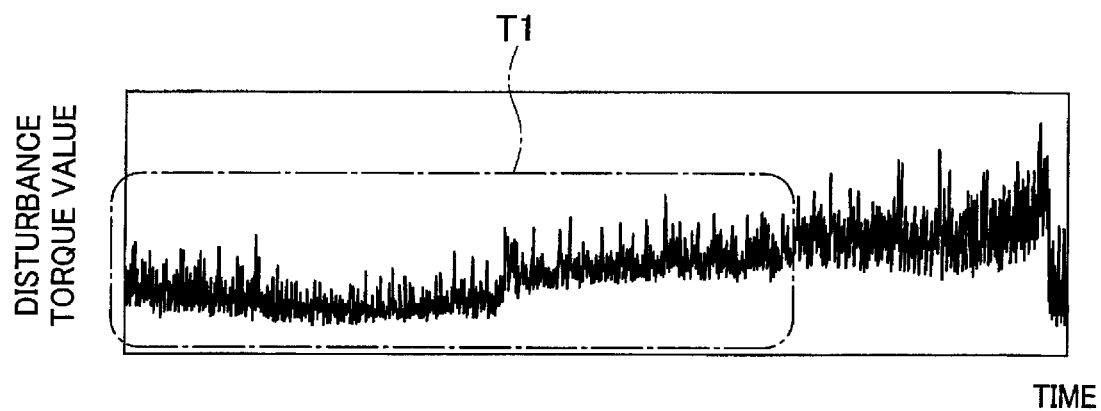
FIG. 5 is a view for explaining problems in an abnormality determination in conventional work equipment.

For example, as illustrated in FIG. 5, if a tool T1 is unchanged, i.e., not replaced, disturbance torque values are within a certain magnitude range, and therefore, setting a threshold value according to past responses enables an abnormality determination.

Figure 6:
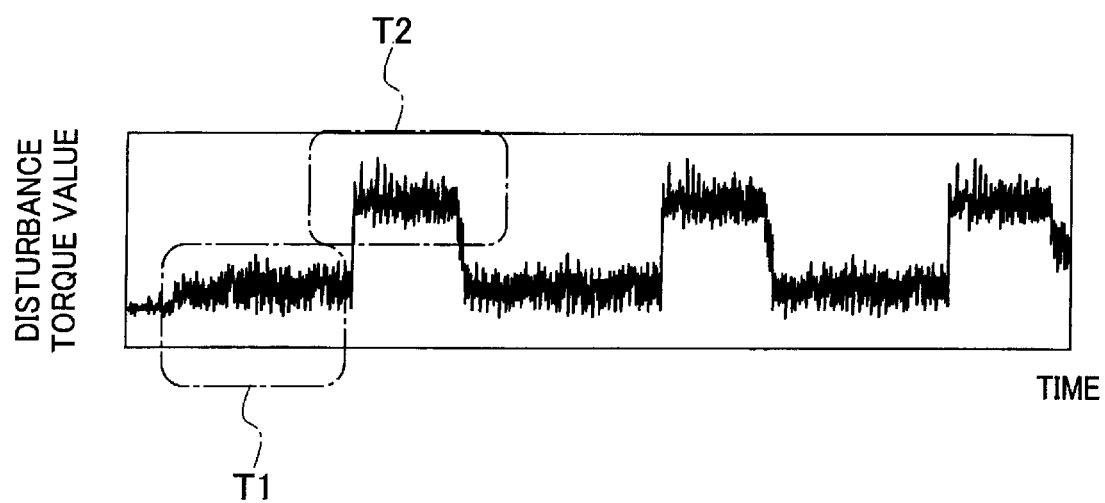
FIG. 6 is a view for explaining problems in an abnormality determination in the conventional work equipment.

However, as illustrated in FIG. 6, even if it is the same robot, if the tool attached to the front end of the robot arm is replaced from T1 to T2, the weights and work motions of the tools greatly change to considerably shift a varying range of disturbance torque values. Due to this, setting the threshold value simply according to past responses is unable to correctly determine an abnormality of the robot 1.

For this, the abnormality determination apparatus 3 according to the embodiment sets, corresponding to the kind of a tool T, abnormality determination data for determining an abnormality of the robot 1, compares the set abnormality determination data with state data of the tool T, and determines an abnormality of the robot 1. With this, it is possible to correctly determine an abnormality of the robot 1 even if the tool T attached to the front end of the robot arm is replaced.

Also, the abnormality determination apparatus 3 according to the embodiment identifies, from maintenance records recorded at the time when a tool T is attached, the kind of the tool T attached to the attaching part. With this, since a maintenance record is always recorded when maintenance is carried out, there will be no need of separately generating special information for identifying the tool T. Accordingly, the tool T is identifiable without arranging an additional structure or process for identifying the tool T.

Also, the abnormality determination apparatus 3 according to the embodiment further includes the state-data-storing database 20 and stores state data according to the identified kind of a tool T in the database 20. With this, state data corresponding to the kind of a tool T is easily acquirable from the database 20.

Also, the abnormality determination apparatus 3 according to the embodiment calculates a threshold value from state data of the time when a kind-identified tool T was being attached and sets the calculated threshold value as abnormality determination data. Namely, the threshold value is set by using the state data of the kind-identified tool T, so that the abnormality determination data corresponding to the kind of the tool T can be set. Accordingly, it is possible to correctly determine an abnormality of the robot 1 even if the tool T attached to the front end of the robot arm is replaced.

Further, the abnormality determination apparatus 3 according to the embodiment processes, with a predetermined learning model, state data obtained at the time when a tool T of an identified kind was being attached and thereby sets abnormality determination data. Namely, the abnormality determination data is set with the use of the state data of the tool T of the identified kind, so that the abnormality determination data corresponding to the kind of the tool T can be set. Accordingly, it is possible to correctly determine an abnormality of the robot 1 even if the tool T attached to the front end of the robot arm is replaced.

Also, according to the abnormality determination apparatus 3 of the embodiment, a plural kinds of tools T include at least a welding tool and a work object holding tool. With this, even if a various kinds of tools are attached, it is possible to correctly determine an abnormality of the robot 1.

Second Embodiment

The second embodiment of the present invention will be explained with reference to the drawings. Here, the same configurations as those of the first embodiment are represented with the same numerals to omit detailed explanation.
(Configuration of Abnormality Determination System)

Figure 7:
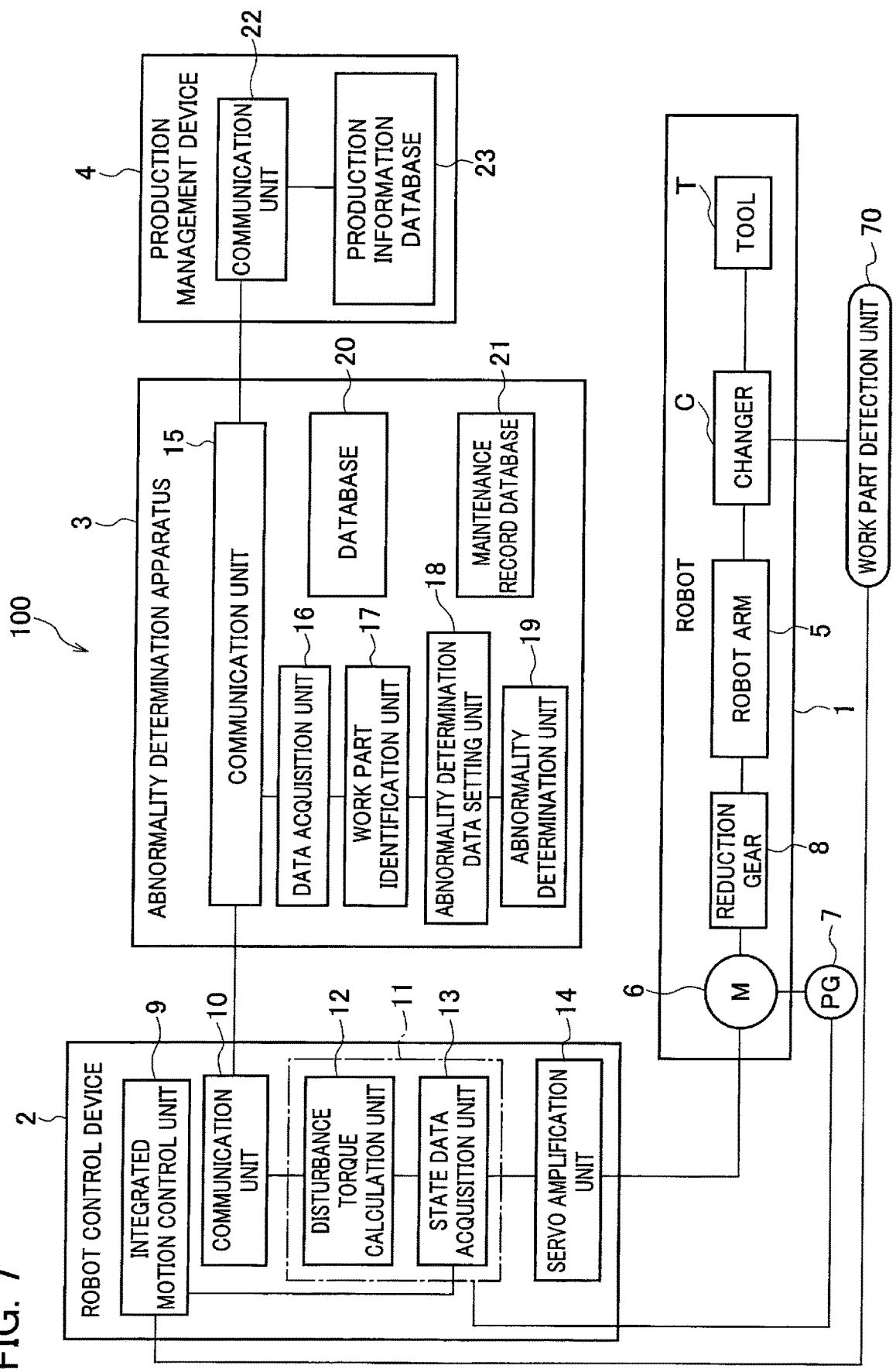
FIG. 7 is a block diagram illustrating an overall configuration of an abnormality determination system according to a second embodiment of the present invention.

FIG. 7 is a block diagram illustrating a configuration of an abnormality determination system provided with an abnormality determination apparatus according to the embodiment. As illustrated in FIG. 7, the abnormality determination system 100 according to the embodiment differs from that of the first embodiment in that the changer C of the robot 1 is provided with a work part detection unit 70.

The work part detection unit 70 functions as a sensor to detect the kind of a tool T attached to the changer C of the robot 1. The work part detection unit 70 detects the kind of the tool T based on a structure of the tool T attached to the changer C. For example, it detects the kind of the tool T from a mechanical connection such as the shape of an attachment forming the changer C.

Also, the work part detection unit 70 may receive a signal transmitted to the tool T, to detect the kind of the tool T according to an electric connection. Further, a communication tag or the like may be set on the tool T, to make the unit 70 possible to communicate with the tool T and detect the kind of the tool T.

The work part detection unit 70 generates, upon detecting the kind of the tool T, identification information such as a label indicating the kind of the tool T and transmits the same to the integrated motion control unit 9. However, the identification information may not be generated by the work part detection unit 70 but may be generated by any unit in the robot control device 2. The generated identification information is transmitted with state data to the abnormality determination apparatus 3 through the communication unit 10.

The data acquisition unit 16 simultaneously acquires, via the communication unit 15, the identification information when acquiring the state data from the robot 1. Thereafter, the data acquisition unit 16 records the acquired state data and identification information in the database 20 according to the kind of the tool T. At this time, the data acquisition unit 16 itself refers to the identification information and records the state data in the database 20 according to the kind of the tool T.

The work part identification unit 17 identifies the kind of the tool T attached to the changer C based on the identification information acquired from the robot 1. For example, since a label indicating the kind of the tool T is recorded as the identification information together with various state data in the database 20, the work part identification unit 17 refers to the label and identifies the kind of the tool T attached to the changer C at the time when the various state data were generated. Also, the work part identification unit 17 may directly acquire the identification information from the robot 1 and identify the kind of the tool T.

(State Data Recording Process)

A state data recording process by the abnormality determination apparatus 3 according to the embodiment will be explained. The state data recording process according to the embodiment differs from that of the first embodiment in step S5 of FIG. 3 of identifying the kind of the tool T and is the same as that of the first embodiment in the other steps. According to the first embodiment, step S5 refers to maintenance records to identify the kind of the tool T. According to the embodiment, it refers to the identification information to identify the kind of the tool T. In this way, the state data recording process of the embodiment is executable by the same flowchart of FIG. 3, and therefore, detailed explanation is omitted.

(Abnormality Determination Process)

An abnormality determination process by the abnormality determination apparatus 3 according to the embodiment will be explained. The abnormality determination process according to the embodiment differs from that of the first embodiment in step S11 of FIG. 4 of identifying the kind of the tool T and is the same as that of the first embodiment in the other steps. According to the first embodiment, step S11 refers to maintenance records to identify the kind of the tool T. On the other hand, the embodiment refers to the identification information to identify the kind of the tool T. In this way, the abnormality determination process of the embodiment is executable by the same flowchart of FIG. 4, and therefore, detailed explanation is omitted.

Effect of Second Embodiment

As explained above in detail, the abnormality determination apparatus 3 according to the embodiment acquires identification information indicating the kind of a tool T from the robot 1, and according to the identification information, identifies the kind of the tool T attached to the changer C. With this, it is possible to easily identify the kind of the tool T only by referring to the identification information.

Also, the abnormality determination apparatus 3 according to the embodiment is further provided with the work part detection unit 70 to detect the kind of a tool T attached to the changer C of the robot 1. With this, it is possible to directly detect the kind of the tool T attached to the changer C, thereby easily detecting the kind of the tool T.

Further, the abnormality determination apparatus 3 according to the embodiment detects the kind of the tool T according to a structure of a tool T attached to the changer C. Accordingly, it is possible to easily detect the kind of the tool T from the shape or the like of an attachment that forms the changer C and eliminate detection errors.

The abnormality determination apparatus 3 according to the embodiment communicates with a tool T attached to the changer C and detects the kind of the tool T. With this, it is possible to detect the kind of the tool T even among tools having the same mechanical connection or attachment shape.

The above-mentioned embodiments are examples of the present invention. The present invention, therefore, is not limited to the above-mentioned embodiments and naturally allows, without departing from the technical ideas of the present invention, other embodiments and various modifications depending on designing and the like.

DESCRIPTION OF REFERENCE NUMERALS

1: Robot
2: Robot control device
3: Abnormality determination apparatus
4: Production management device
5: Robot arm
6: Servomotor
7: Pulse coder
8: Reduction gear
9: Integrated motion control unit
10, 15, 22: Communication unit
11: Servo control unit
12: Disturbance torque calculation unit
13: State data acquisition unit
14: Servo amplification unit
16: Data acquisition unit
17: Work part identification unit
18: Abnormality determination data setting unit
19: Abnormality determination unit
20: Database
21: Maintenance record database
23: Production information database
70: Work part detection unit
100: Abnormality determination system
C: Changer
T: Tool

The invention claimed is:

1. An abnormality determination apparatus for determining an abnormality of a work equipment comprising an arm driven by a motor driving system and provided with an attaching part to which a plural kinds of work parts are attached in a replaceable manner, the apparatus comprising:
a controller that acquires state data from the work equipment indicating a state of the work equipment and determines an abnormality of the work equipment, wherein the controller:
acquires, as the state data, data on a disturbance torque applied to the motor driving system;
identifies a kind of a work part attached to the attaching part;
sets abnormality determination data corresponding to the identified kind of the work part, for determining the abnormality of the work equipment, by using the state data of a time when the identified kind of the work part was attached;
acquires a latest state data of a time when the identified kind of the work part was being attached from among state data acquired from the work equipment; and
compares the acquired latest state data with the set abnormality determination data to determine an abnormality of the work equipment.

2. The abnormality determination apparatus according to claim 1, wherein the controller identifies the kind of the work part attached to the attaching part according to a maintenance record recorded when the work part was attached.

3. The abnormality determination apparatus according to claim 1, wherein the controller acquires identification information indicating the kind of the work part from the work equipment, and identifies the kind of the work part attached to the attaching part according to the identification information.

4. The abnormality determination apparatus according to claim 1, further comprising a memory for storing the state data, wherein the controller records the state data in the memory according to the identified kind of the work part.

5. The abnormality determination apparatus according to claim 1, wherein the controller calculates a threshold value from the state data of the time when the identified kind of the work part was being attached and sets the calculated threshold value as the abnormality determination data.

6. The abnormality determination apparatus according to claim 1, wherein the controller processes the state data of the time when the identified kind of the work part was being attached with use of a predetermined learning model to set the abnormality determination data.

7. The abnormality determination apparatus according to claim 1, wherein the plural kinds of work parts include at least a work part for welding and a work part for holding a work object.

8. The abnormality determination apparatus according to claim 1, wherein the controller acquires, as the state data, data on the disturbance torque applied to the motor driving system, excluding abnormal values due to emergency stops of the work equipment.

9. An abnormality determination system comprising:
a work equipment comprising an arm driven by a motor driving system and provided with an attaching part to which a plural kinds of work parts are attached in a replaceable manner; and
an abnormality determination apparatus for acquiring state data from the work equipment indicating a state of the work equipment and determining an abnormality of the work equipment, wherein the abnormality determination apparatus:
acquires, as the state data, data on a disturbance torque applied to the motor driving system;
identifies a kind of a work part attached to the attaching part;
sets abnormality determination data corresponding to the identified kind of the work part, for determining an abnormality of the work equipment, by using the state data of a time when the identified kind of the work part was attached; and
acquires a latest state data of a time when the identified kind of the work part was being attached from among state data acquired from the work equipment and compares the acquired latest state data with the set abnormality determination data to determine an abnormality of the work equipment.

10. The abnormality determination system according to claim 9, further comprising:
a sensor for detecting the kind of the work part attached to the attaching part of the work equipment.

11. The abnormality determination system according to claim 10, wherein the sensor detects the kind of the work part according to a structure of the work part attached to the attaching part.

12. The abnormality determination system according to claim 10, wherein the sensor communicates with the work part attached to the attaching part to detect the kind of the work part.

13. An abnormality determination method for determining an abnormality of a work equipment comprising an arm driven by a motor driving system and provided with an attaching part to which a plural kinds of work parts are attached in a replaceable manner, by acquiring state data from the work equipment indicating a state of the work equipment, the method comprising:
acquiring, as the state data, data on a disturbance torque applied to the motor driving system;
identifying the kind of a work part attached to the attaching part;
setting abnormality determination data corresponding to the identified kind of the work part, for determining an abnormality of the work equipment, by using the state data of a time when the identified kind of the work part was attached; and
acquiring a latest state data of a time when the identified kind of the work part was being attached from among state data acquired from the work equipment and comparing the acquired latest state data with the set abnormality determination data to determine an abnormality of the work equipment.

* * * * *